United States Patent [19]
Brown

[11] 3,797,002
[45] Mar. 12, 1974

[54] DYNAMICALLY DOUBLE ORDERED SHIFT REGISTER MEMORY

[75] Inventor: David T. Brown, Wappingers Falls, N.Y.

[73] Assignee: International Business Machines Corporation, Armonk, N.Y.

[22] Filed: Nov. 16, 1972

[21] Appl. No.: 307,258

[52] U.S. Cl. 340/174 SR, 340/173 R, 340/174 GA, 340/174 TF, 307/221 C
[51] Int. Cl.. G11c 19/00, G11c 11/14, G11c 11/40
[58] Field of Search.... 340/174 TF, 174 SR, 173 R; 307/221 C

[56] References Cited

UNITED STATES PATENTS

| | | | |
|---|---|---|---|
| 3,670,313 | 6/1972 | Beausoleil et al. | 340/174 SR |
| 3,704,452 | 11/1972 | Beausoleil et al. | 340/172.5 |
| 3,737,881 | 6/1973 | Cordi et al. | 340/174 TF |
| 3,766,534 | 10/1973 | Beausoleil et al. | 340/172.5 |

*Primary Examiner*—James W. Moffitt
*Attorney, Agent, or Firm*—James E. Murray

[57] ABSTRACT

This specification discloses a memory made up of a plurality of bidirectional shift registers capable of being accessed at either end. Each shift register stores only one bit of every page of data stored in the memory so that all the bits of any one page can be read out contemporaneously by accessing the shift registers in parallel. All the pages stored in the memory are divided into two groups with all the pages of one group being accessed at one end of the shift registers while all the pages of the other group are accessed at the other end of the shift registers. Within each group the pages are arranged in order of last use with the most recently used page located closest to the end of the shift register at which it is being accessed.

6 Claims, 6 Drawing Figures

DYNAMICALLY DOUBLE ORDERED SHIFT REGISTER MEMORY

BACKGROUND OF THE INVENTION

The present invention relates to shift registers, particularly shift registers used to store a large amount of data.

In U.S. Pat. No. 3,670,313, filed Mar. 22, 1971 in the names of William F. Beausoleil, et al., and entitled "Dynamically Ordered Magnetic Bubble Shift Register Memory" a shift register memory containing a plurality of K position shift registers is described. In this memory every bit of each page of data in the memory is stored in a separate shift register and within each shift register the bits in order of last use. Therefore, the bits of the last page of data accessed is in the last or the access position K of the registers so that they can be read out of the memory without shifting the registers. Furthermore, the bits of the next to the last page of data accessed are stored in the K–1 position of the registers or the position preceding the K position so that the registers only have to be shifted once to place these bits in the access position K of the shift registers in order to read them out and so on. It was found that by storing data in this manner any desired page of information could be reached with considerably less shifts on the average than would be necessary if the data had been stored randomly in the shift register.

THE INVENTION

In accordance with the present invention the memory described in the referenced patent and the arrangement of data within the memory are modified to further reduce the amount of shifting necessary to access the memory. This modified memory is made up of a plurality of bidirectional shift registers capable of being accessed at either end and all the pages of data stored in these shift registers are divided into two groups with the pages of one group being accessed at one end of the shift registers while the pages of the other group are accessed at the other end of the shift registers. Within each group the pages are arranged in order of last use with the most recently used page located closest to the end of the shift register at which it is being accessed.

Preferably, one group is made up of all the odd numbered pages in the page addressing sequence and the other group contains all the even numbered pages in the page addressing sequence. Thus, the last or low order digit in the page address can be used to distinguish between the groups. If this digit is a binary 1 the page is an odd numbered page and, alternatively, if the digit is 0 the page is an even numbered page. When accessing the memory this last digit of the requested page address is examined and if the digit is a binary 1 the data in the shift registers is shifted in one direction to place the requested page in the $K^{th}$ position of the shift register and if the digit is a binary 0 the shift register is shifted in the opposite direction to place the requested page in the $K^{th}$ position of the register. When the currently requested page is placed in position K a reordering mode occurs. Here the pages of data in all positions of the shift registers, except position K, are shifted until all pages having addresses ending in a binary 1 are positioned at one end of the shift registers and all pages having addresses ending in a binary 0 are placed at the opposite end of the shift registers.

If the addressed page was the last used or next to last used in the use sequence there is no improvement in performance with this new arrangement. However, in the case of pages in any other order in the use sequence the number of shifts necessary to access will average out to be less than half those necessary to access a similarly ordered page in the memory of the mentioned patent and the average number of shifts to reorder the pages of data after accessing will be slightly less than half those necessary to reorder the pages of data in the memory of the previously mentioned patent.

Therefore, it is an object of the present invention to reduce the amount of shifting necessary to access data in dynamically ordered shift registers.

It is another object of this invention to reduce the amount of shifting necessary to obtain data from dynamically ordered shift registers by dividing the data stored in the shift registers into two groups and within each group dynamically ordering bits in order of last use.

It is still another object of this invention to provide a magnetic bubble shift register capable of storing data in shift registers in two groups with the data in each group capable of being shifted to the access position of the shift register in the order in which it was last previously accessed.

These and other objects, features and advantages of the invention will be apparent from the following more particular description of the preferred embodiment of the invention as illustrated in the drawings, of which:

DESCRIPTION OF THE PREFERRED EMBODIMENT

The invention will first be explained with reference to the simplified diagrams of FIGS. 1 and 2, as this will facilitate understanding of the more detailed operating circuitry of the other figures.

EXPLANATION OF SIMPLIFIED DIAGRAMS

Figure 1:
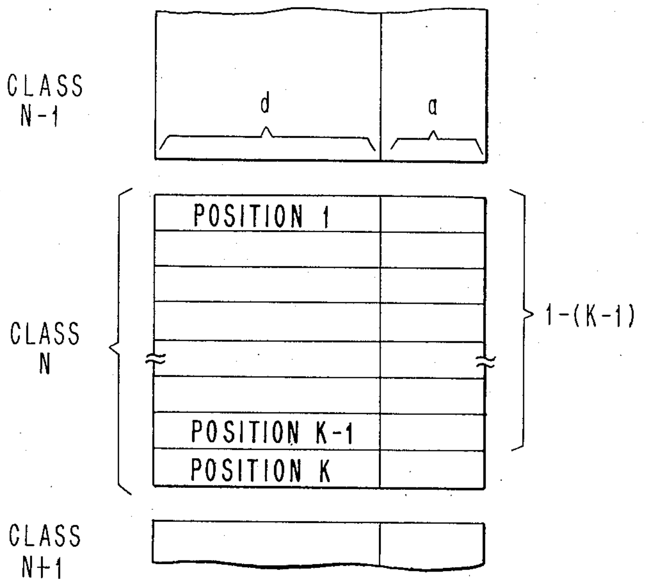
FIG. 1 is a diagrammatic layout explanatory of shift register arrangement in storage according to one embodiment of the present invention.

FIG. 1 partially illustrates in diagram three congruent classes of storage registers N, N+1 and N−1 each of which is equipped for separate access and for page reordering in accordance with the invention. Each class is made up of shift registers which extend and shift longitudinally of the figure, each register having K shift positions, K being equal to the page storage capacity of the class. Each side-by-side shift position of these registers contains all the bits of a page. There are, therefore, a group of registers d equal in number to the number of data bits per page, plus a group a equal to the number of address bits per page. The registers are shifted in unison so that the pages are shifted successively from one position to the next. Position K is the page position equipped for address testing and read-write accessing.

Figure 2:
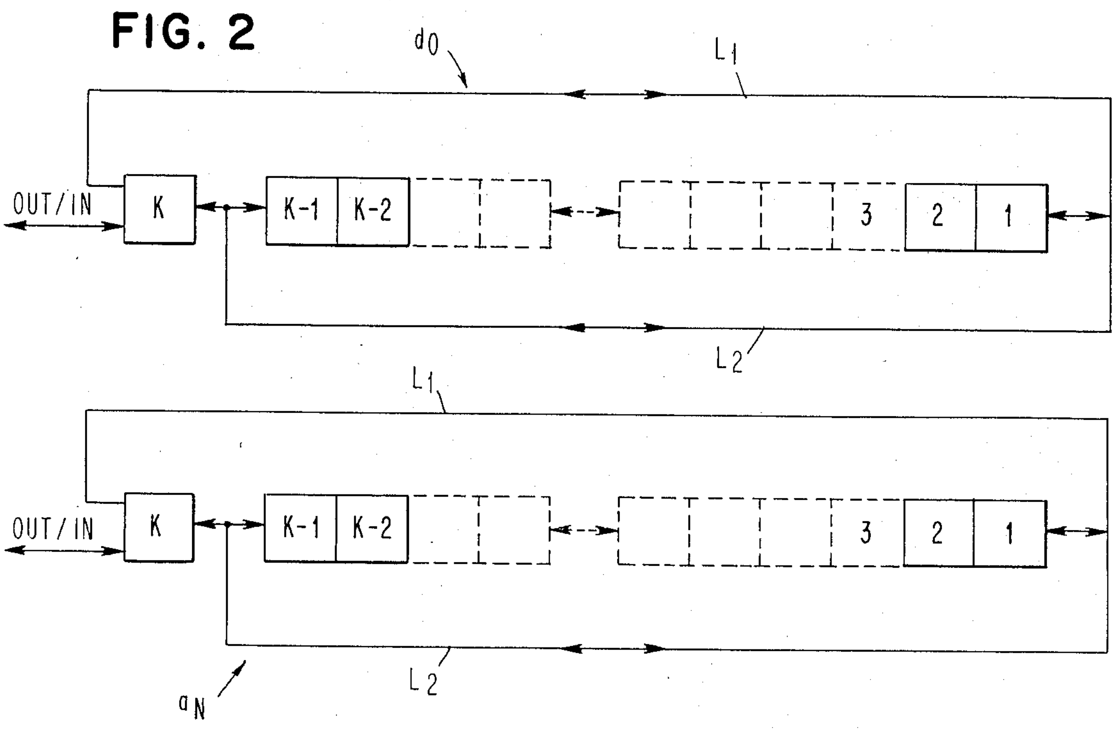
FIG. 2 shows by symbol certain positions of two of the K position shift registers of FIG. 1 and illustrates the manner of shifting and input-output connections.
Figure 3:
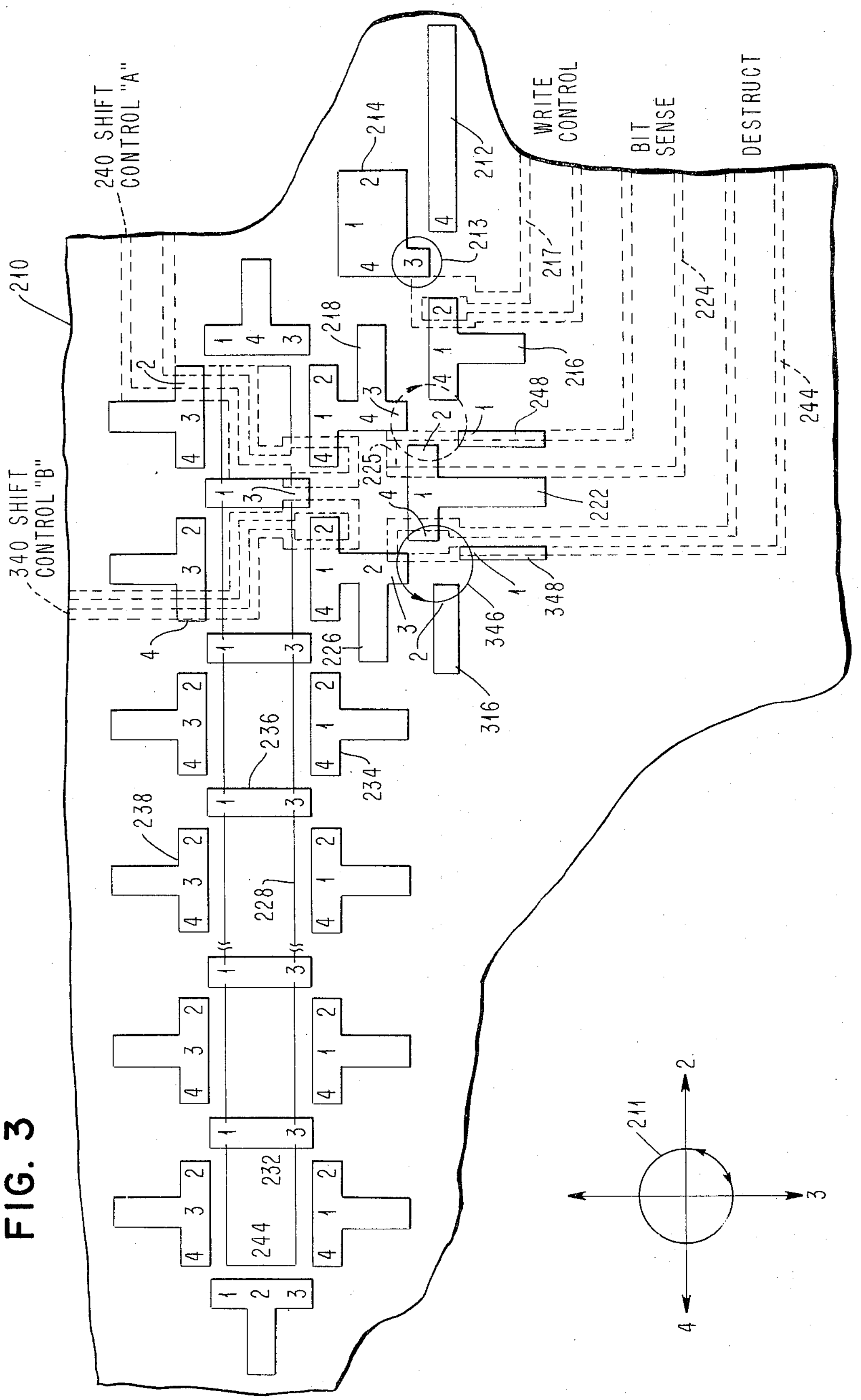
FIG. 3 is a layout for one of the magnetic bubble domain shift registers fabricated in accordance with the present invention.

FIG. 2 illustrates the manner of shifting and accessing the pages of a class of registers. In this figure the rectangles are symbolical of the topological units or storage cells of a two way static shift register such as shown in FIG. 3 and hereinafter described. Only two of the registers of the class are indicated, these being the first order data register $d_o$ and the opposite end register $a_n$ for the page address field. It will be understood that between the two indicated registers are the remainder of the data registers $d$ and all of the address registers a of FIG. 1, these having the same number of storage cells as the two registers shown and the same shift connections for shifting all registers in unison.

In FIG. 2, all registers are connected for shifting in two different loops, a loop $L_1$ in the figure, which includes all positions including the K position, and a loop $L_2$ in the figure which includes all positions except K. Read and write access is had to each bit position of a page in the K position as indicated by the lines labeled OUT/IN. Therefore, the class of data may be initially loaded a page at a time by writing in the cells of position K and then shifting their contents in loops $L_1$ one bit position to the first stage of the memory. This alternate entering and shifting operation will continue until the first two pages entered end up in positions K and K–1.

Storage of the class of data within the shift registers is in two groups. Within each group, pages are ordered by most recent use. One group contains all the odd numbered pages in the page addressing sequence and the other group contains all the even numbered pages in the page addressing sequence. Thus, the last or low order digit $a_n$ in the page address $a_o$ to $a_n$ can be used to distinguish between the groups. If the digit is a binary 1 the page is an odd numbered page and, alternatively, if the digit is a 0 the page is an even numbered page. When a request for access to the class is made the address of the desired page is compared with the address bits $a_o$ to $a_n$ of the page in position K. If there is a match, access to the requested page is obtained without shifting. However, if there is no match on this first address comparison the group containing the page must be identified before the particular page is accessed. For this purpose, the low order bit position $a_n$ of the page address $a_o$ to $a_n$ is examined. If this bit is a 0, the page is in the group containing the even numbered pages and access shifting will be counterclockwise in loop $L_1$. If this bit is a 1, the page is in the group containing the odd numbered pages and the access shifting will be clockwise in loop $L_1$. Once the direction of shifting is determined the shift registers are shifted one bit position in that direction on loop $L_1$ and the address bits of the page placed in position K by the shift are compared with those of the requested page. If a match is obtained, access to the page in position K is provided. If there is no match, the search for the requested page using the described shift and compare sequence continues until a match is obtained.

Once a page has been moved into the K position from some other position of the register, the register must be reordered to place the data back in its proper group and use sequence. This is done using paths $L_2$ so as to leave the accessed page in the $K^{th}$ position. If the accessed page is an even numbered page ($a_n = 0$) the data is shifted in loop $L_2$ in a clockwise direction. If the accessed page was an odd ordered page ($a_n = 1$) before it was accessed, the data is shifted in the clockwise direction in loop $L_2$. The number of shifts involved depends on the previously accessed page. If this page is from the same group as the presently accessed pages the number of shifts necessary to reorder is the same as required to access. However, if the previously accessed page is from the other group, then the number of shifts required is one less than that necessary to access the present page. Since the K position is excluded from loop $L_2$ the reordering shift loop $L_2$, the requested page therein remains accessable despite shifting in loop $L_2$.

I have pointed out previously that this new ordering scheme results in improvement in performance in accessing data where the data is located in certain of the shift register positions. If the address page was the next to last used or next to last used in the use sequence there will be no improvement. However, in pages located in any other position in the use sequence the number of shifts necessary to access will average out to be less than half those necessary to access the similarly ordered page in the memory of the mentioned patent and the average number of shifts to reorder the data after accessing will be slightly less than half those necessary to access the memory of the previously mentioned patent.

EXPLANATION OF THE BUBBLE DOMAIN SHIFT REGISTER

FIG. 3 shows a K position closed-loop shift register in accordance with the present invention. An overlay pattern including T and I permalloy bars for the shift register stages, conductor patterns for control, and the associated domain platlet 210 are shown. The platelet 210 as all such platelets from which magnetic domain shift registers of this type are made is under the influence of a bias magnetic field directed perpendicular to the plane of the platelet. The bubbles are moved from one permalloy pattern to another by sequentially magnetizing the permalloy pattern closest to the bubble in a cyclic fashion. This is achieved by the rotating magnetic field 211 which is in the plane of the platelet 210 and which can be rotated in either a clockwise or counterclockwise direction. The drawing contains numbers on the permalloy patterns which correspond to the numbers for the in-plane field direction and illustrates where a bubble resides along any one of the permalloy patterns when the in-plane field is directed in the correspondingly numbered direction. It is assumed that initially there is no data stored in the register and the description, therefore, begins with a description of how data is initially stored in the register, proceeds to how the data can thereafter be read out or written into the register, and finally covers how the data can be ordered into the order of most recently used data residing nearest the access position.

The extended permalloy T bar 212 functions as a nucleating element. This nucleating bar 212 is twice the length of any other bar in the shift register. Because of this added length this bar 212 can be used to generate the mother bubble 213 for the register. This is because it saturates at a lower field strength than the other patterns in the register, thus allowing the generation of a bubble on bar 212 by the rotating field 211 without causing the generation of bubbles at other points in the register. Therefore, as the field rotates in a counterclockwise direction into the direction 4 a bubble is formed at point 4 on the nucleating bar 212. As the field continues to rotate in a counterclockwise direction this bubble is attracted to position 3 on a permalloy bubble generating plate 214. Once in position 3 the bubble 213 forms the mother bubble from which all other bubbles to be used in the memory will be generated.

From the bubble generating plate 214 bubbles are transferred to the accessing stage 215 of the memory and from there into the other positions of the memory. To see how this is done, let us assume that there is no data stored in the memory and the field 211 is being rotated in a counterclockwise direction. Furthermore, let us assume that a 1 is to be written into the register. If this is the case the mother bubble 213 is then drawn towards two 2 positions, one 2 position on the bubble generating plate 214 and the other 2 position on the write control T bar 216. As the field continues to rotate the mother bubble 213 stretches and eventually snaps leaving a bubble in the write control T bar 216. This places a 1 in the write control T bar to be inserted into the access position 215 of the register. To place a 0 in the write control T bar 216 a control current is applied to the write control printed wiring pattern 217 in a manner to oppose the field generated by the write control T bar when the rotating field is in the 2 direction. Because of this control current the mother bubble 213 is not drawn towards the write control T bar 216 and no bubble is in the 2 position of the write control T bar. Therefore, by controlling current in the write control wiring pattern 217 it can be determined whether a 1 or a 0 is placed on the write control T bar 216. If a bubble is placed on the write control T bar 216 a 1 has been generated. If no bubble is placed on the write control T bar 216, a 0 has been generated.

Continued rotation of the magnetic field 211 in the counterclockwise direction shifts the field to the 3 position causing the bubble on the T bar 216 if there is one, to be placed into the primary permalloy pattern 218 of the access stage 215 of the shift register. The field continues rotating in a counterclockwise direction placing the bubble into the 2 position where it enters the access position T bar 222. This point on the bar is the sense point for the memory chain. As the bubble crosses the bit/sense lines 224 under the T bar 222 it causes a flux change in the bit/sense lines which can be sensed by a change in the resistance of a magneto-resistive element 225 in the line. This sensing during the initial write cycle assures that the proper data is being written into the cell since it provides a means to determine whether a bubble is or isn't present in the 2 position when it is or isn't supposed to be.

The data in the access position or the K position of this K bit shift register must be placed in the K–1 position of the shift registers. This is done by continued rotation of the field in the counterclockwise direction so that the bubble is moved out of the sensing position 2 of the access position T bar 222 across the top of the T bar to the 4 position and on to the 3 position of the exit permalloy pattern 226 for the access position. When the bubble arrives in the 1 position on the exit pattern 226 it leaves the access position 215 of the register and enters the first position of the register. At this point it is in the main loop 228 of the register and as the field continues to rotate in a counterclockwise direction the bubble moves in the main loop of the register in the direction of the arrow 230 transferring from the first position of the register to the second position to the third position and so on. Or in other words, the bubble continues from the exit pattern 226 to the I bar 230 to T bar 234 to I bar 236 and so on in the sequence of the bubble position numbers along the bottom row of T bars and then the top row of T bars. This continues until this bit of information is placed in the 2 position on the entrance permalloy pattern 218 for the access position where it is the K–1 position of the shift register. When this occurs data has been stored in the 2 position in each of the peripheral T bars of the main loop of the memory with the exception of the 2' position on the exit pattern 226. To fill the exit pattern 2' position the rotating field is reversed when the final bubble for the main loop 228 is placed in the 4 position of the exit pattern 226. The field 211 is then rotated in the clockwise direction until the bubble is placed in the 2' position to fill the register and the register is full. With the register full the data can be left stationary in the register under the influence of the magnetic bias field until it is ready to be accessed.

In entering the data as described above all the bits from pages in the odd numbered group or those identified by $a_n = 1$ are entered first in the order in which they were last used or in the order in which it is anticipated they will be used. Once the bits from the odd ordered page have been entered the bits from all the pages in the even numbered group or those identified by $a_n = 0$ are entered in reverse order to the order in which they were last used. By entering data in this manner when the last bit is entered the bits from the most recently used page will have been entered into the $K^{th}$ position of the register, the bits from the even numbered group of pages ($a_n = 1$) will have been entered at the position 1 end of the register and the bits from the odd numbered group of pages ($d_n = 1$) will have been entered into the K–1 end of the register.

To read a bit from the even numbered group in the shift register, the rotating magnetic field is rotated in the counterclockwise direction. Assume for the moment that the bit stored a bit position 2 on T bar 238 is from an even ordered page. Then the rotation of the magnetic field causes the shifting of the data from position 2 of T bar 238 to position 2 on the input pattern 218 for the access position 215 of the memory. In this position the bit of data being accessed is in the K–1 position of the memory. To remove this bit of data from the main loop 232 and place it into the access position, a control pulse is applied to the shift control printed circuit pattern 240. This causes a field which opposes and cancels the field produced at position 4 of the input pattern for the access stage when the rotating field is oriented in direction 4. The bubble is, therefore, diverted towards the position 4' in the access stage 215 instead of continuing on in a straight pattern to position 4 in the main loop 228. As the field continues to rotate the bubble goes in sequence from position 4' to position 3 in the input pattern 218 and from position 3 in the input pattern to position 2 in the T bar pattern 222 where it is sensed by the detection of a resistive change in bit/sense line pattern 224 as previously described.

Once sensed the bubble continues down the T bar pattern 222 to position 4 of the T bar 222 where a pulse can selectively be or not be applied to the destruct winding pattern 224 to respectively destroy or not destroy the bubble. If the data is not to be destroyed as in the case where the read data is to be used again, no pulse is applied to the winding pattern 244 and the data is placed back in the main loop 228 when the next access is made. However, when new data is to be written into the bit position a pulse is applied to the destruct pattern 244 to destroy the data. With the data destroyed new data is placed into the access position 215 in the manner previously described in connection with the initial loading of the register and simultaneously with the movement of the accessed data from position 2 to position 4 on the T bar. In doing this, let us again assume that a 1 is to be written into the register. If this is the case, the mother bubble 213 is drawn towards two 2 positions, one 2 position on the bubble generating plate 214 and the other 2 position on the write control T bar 216. As the field continues to rotate the mother bubble 213 stretches and eventually snaps leaving a bubble in the write control T bar 216. This places a "1" in the write control T bar to be inserted into the access position 215 of the register. To place a "0" in the write control T bar 216 a control current is applied to the write control printed wiring pattern 217 in the manner to oppose the field generated by the T bar when the rotating field is in the 2 direction. Therefore, the mother bubble 213 is not drawn towards the write control T bar 216 and no such bubble is provided in the write control T bar 216.

Once data has been rewritten into the access position the data in the main loop 228 of the shift register must be reordered in order of last use. This is accomplished by reversing the direction of rotation of the field 211 to the clockwise direction. This requires that all the data in the main loop be moved in the direction 244 the same number of shifts as required to move the data into the access position in direction 232. When the rotation is so reversed the data in the main loop 228 starts moving in the direction indicated by arrow 244 until the data has been reordered in the proper sequence. At the same time, data in the access position continuously flows around loop 246 between the 2 position on the access position T bar 222, the 3 position on the input pattern 218, the 4 position on bubble generating T bar 216 and the 1 position on I bar 248. Thus, it can be seen with the shift register of FIG. 3 how data can be shifted to the access position for reading and writing and while the data in the access position is maintained there the other data can be reordered.

Thus far the procedure for accessing a bit of an even numbered page has been described. In the procedure the access shifts are controlled by a counterclockwise rotation of the magnetic field, and the reorder shifts are controlled by a clockwise rotation. In the accessing a bit of an odd numbered page the order of field rotation is reversed. That is, accessing is accomplished with a clockwise rotation of the magnetic field and reordering is done with the counterclockwise rotation of the field.

To illustrate this, let us assume that a bit from an odd numbered stage is stored at bit position 2 on T bar 238 and that the magnetic field is rotating in a clockwise direction. Then, the data will shift along path 228 in direction 228 until it reaches bit position 1 on pattern 226. Once in position 1, the data is diverted off path 228 onto bit position 2' by a control signal to the shift control pattern 340. Then, as the field continues to rotate in the clockwise direction, the bubble continues to position 3 of pattern 226, and from there to position 4, position 1, and position 2 of pattern 222 where it is sensed. Once it has been sensed, the bubble returns to the main loop 228 through pattern 218. Movement of data in this path continues until the bit from the desired page or the bit originally stored at position 2 of T bar 238 is sensed at bit position 2 of T bar pattern 222. When this happens the shift control pulse is removed from line 340 and the direction of the field rotation is changed to the counterclockwise direction so that data in the main loop 228 moves in the direction of arrow 232. This includes all the bits in the shift register except the bit in the access position and continues until the bits of data are reordered in the two groups in order of use as described previously. As reordering continues, the bit in the access position which is initially at position 2 of pattern 222 moves back along pattern 222 to position 1, then position 4. Once in position 4 it circulates in loop 346 until reordering is complete, going from position 4 of pattern 222 to position 3 of pattern 226, to position 2 of pattern 316, to position 1 of pattern 348 and back to position 4 of pattern 222.

The arrangement shown takes advantage of the inherent bidirectional nature of movement of bubbles in the bubble domain shift register and provides the two data transferring loops without requiring any significant increase in area on the platelet for the shift register. Furthermore, because of the data ordering arrangement described herein very large magnetic bubble domain loops can be used with on the average very short access delays when compared with data which is randomly arranged in such registers. This permits very efficient fabrication of the bubble domain registers.

Figure 4:
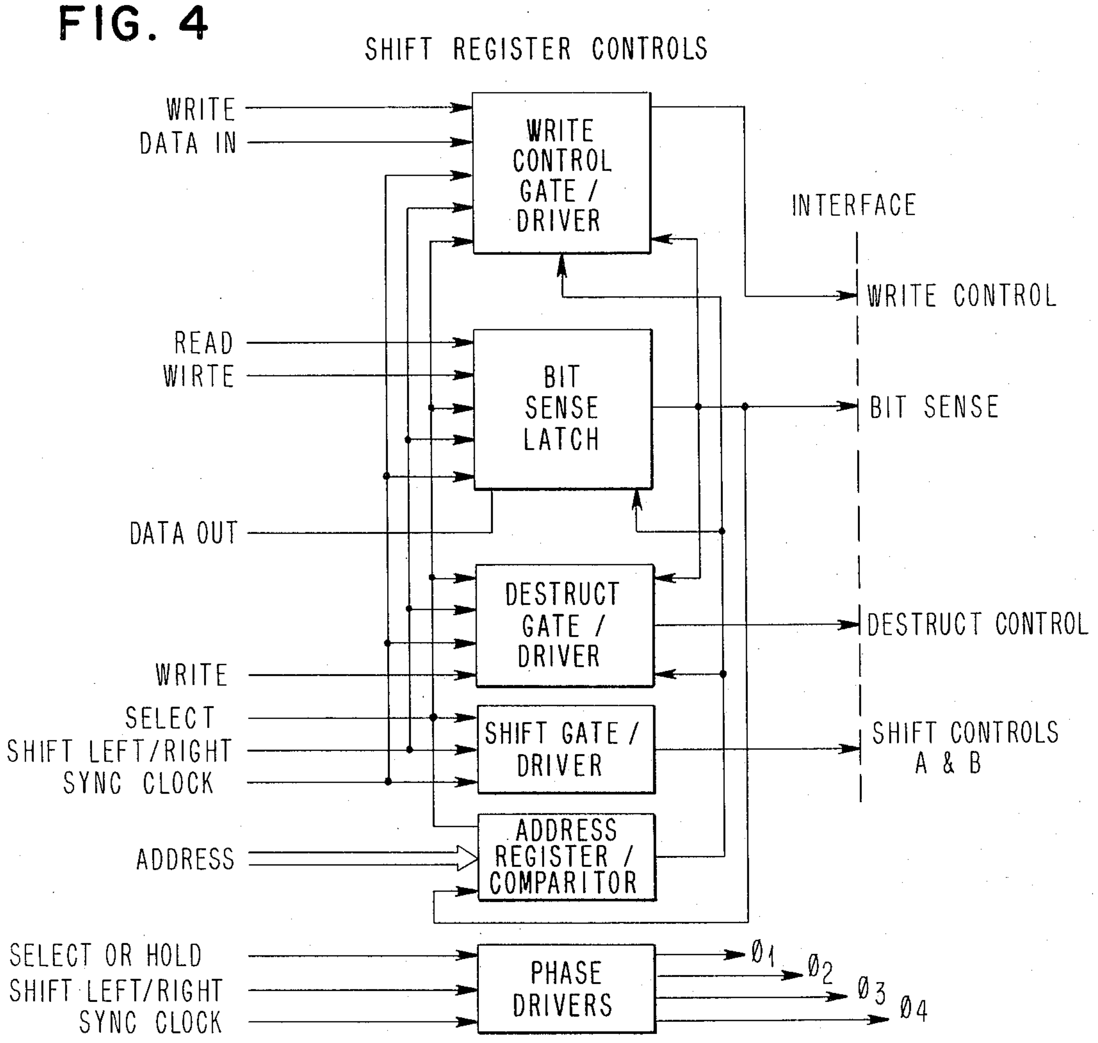
FIG. 4 is a block diagram of the control and access circuits for the bubble shift register shown in FIG. 3.

FIG. 4 of the drawings is a block diagram of the circuits for generation and detection of the electrical signals required to access the shift register of FIG. 3. The blocks shown here are standard drivers, latches and comparators and are not shown in detail since they do not constitute part of the present invention.

Figure 5A:
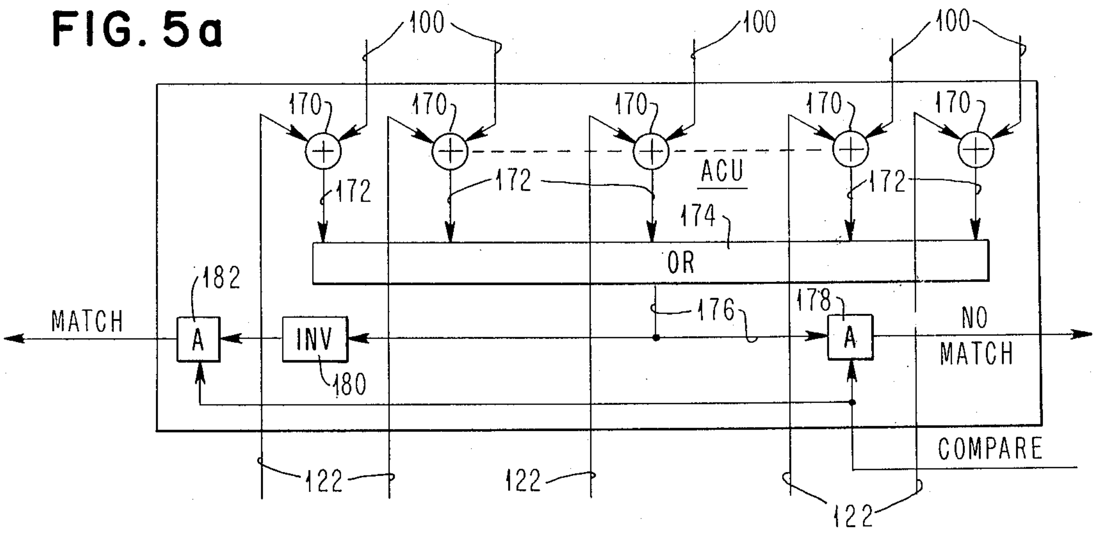
FIG. 5A diagrams comparison circuitry which may be used in the Address Comparison Unit of FIG. 5.
Figure 5:
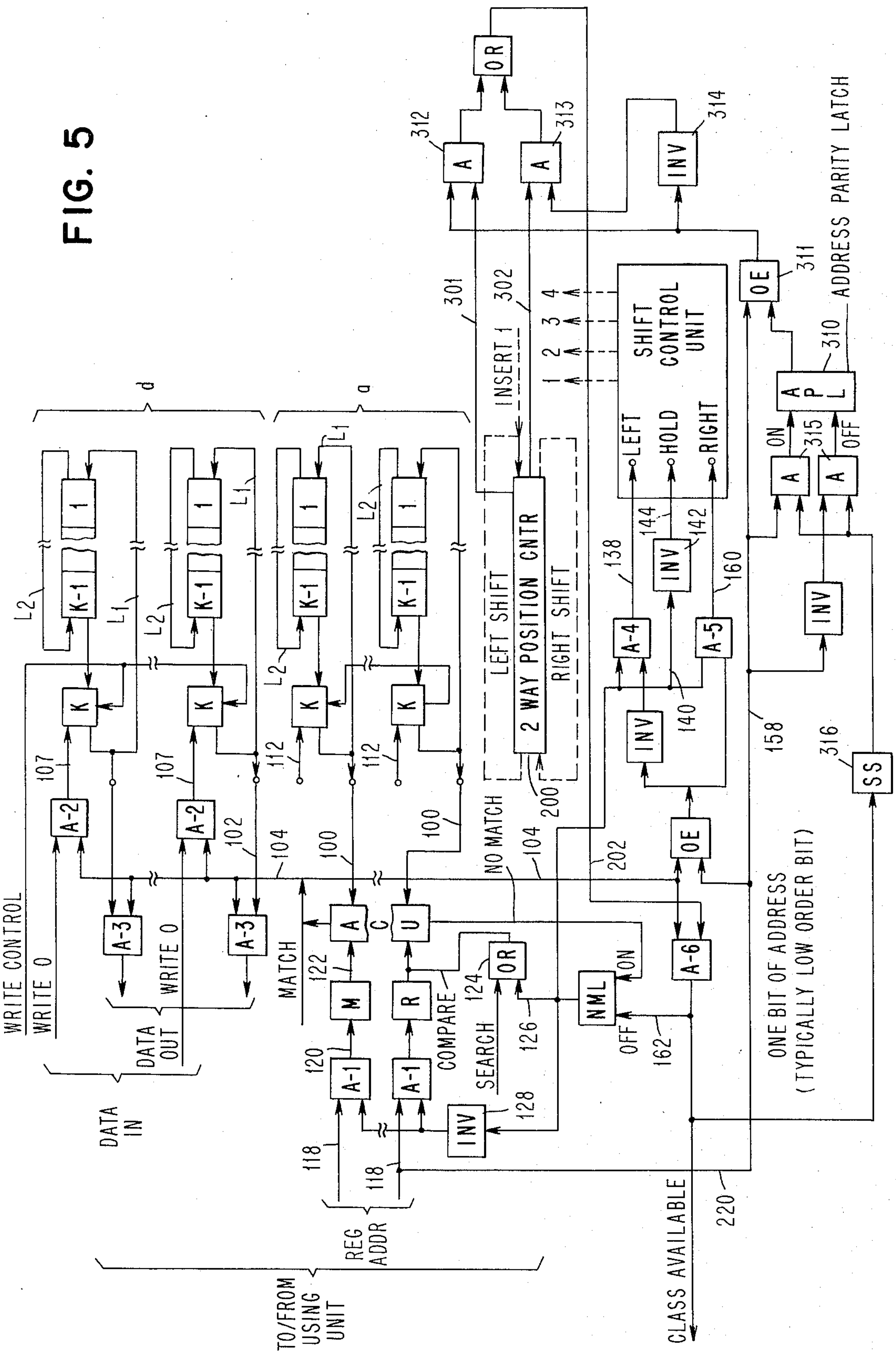
FIG. 5 shows in block diagram controls for operating the registers of the embodiment of FIGS. 1–4 and for reordering their pages according to the invention.

FIG. 5 shows control circuitry for the registers of a class according to the embodiment diagrammatically illustrated in FIGS. 1 and 2, utilizing shift registers and connections according to FIGS. 3 and 4. There are d address registers (first and last only shown) a address registers (first and last only shown), K–1 (nearest) and I (most remote) being shown. The two shift loops for the registers are designated as in FIG. 2, $L_1$ for the loop including position K, and $L_2$ for the loop excluding position K.

The address bits of the K position of the address registers are applied over lines 100 to corresponding terminals of an Address Comparison Unit labeled ACU. Each K position bit of the data registers has an output from its output circuitry of FIG. 4 to an AND gate designated A–3, the other terminal of which is conditioned from a line 104; and two input lines 107 and two AND gates A–2 which are connected respectively to the inlines of each bit shift register. The A–3 AND gates have DATA OUT lines 108 for transmitting the data from the corresponding K positions of the data registers to the using unit of the system. The A–2 AND gates have input lines WRITE O from the data source of the system which condition one terminal of these respective AND gates, the other terminal thereof being conditioned from line 104. (The input lines (not shown) to input terminals 112 of the K positions of the address registers would be utilized only when initially loading all registers of the class and may, for example, come from a counter.)

A using unit requesting access to a page sends each of the address bits thereof over lines 118 to AND gates A–1 which are conditioned as hereinafter explained and from which the bits are passed by lines 120 to corresponding bit positions of a Memory Address Register labeled MAR. The bits from the MAR are in turn applied to corresponding terminals of the Address Comparison Unit ACU by lines 122. In addition, the low order address bit $a_n$ is placed on line 220 to control shifting. While only two of the lines and gates mentioned in the preceding sentence are shown in FIG. 5, these corresponding to the two-out-of-a address register shown, it will be understood that there will be a such lines and gates.

The ACU may utilize conventional comparison circuitry which produces an output on a line labeled NO MATCH when any of the compared bits are not the same and an output to a line labeled MATCH when all compared bits are the same. The ACU circuitry shown in FIG. 5A is hereinafter described. The MAR is a conventional storage register which applies its 1 or 0 bit values to lines 122.

Simultaneously with loading the MAR, the using unit sends a signal on a line labeled SEARCH which, through OR gate 124 and a line labeled COMPARE, activates the comparison circuitry. If the requested address is that of the last accessed page, that page will be in position K and the ACU will provide an output to the line labeled MATCH which signals the using unit that the desired page is in access position. Also, the output on the MATCH LINE goes to line 104 and conditions the AND gates A–2 to apply the data signals, if any, provided by the using unit on the WRITE O lines to the input circuitry of the K position data cells. The MATCH signal on line 104 also conditions the AND gates A–3 for readout, so that the using unit can read or write at its election. The MATCH output to line 104 also conditions one terminal of AND gate A–6, the other terminal of which is conditioned by the 2 WAY K POSITION COUNTER to provide a signal on the using unit on a line labeled CLASS AVAILABLE, signifying that the using unit may start another search as soon as it has completed its read or write operation. Read/write gates A–2 and A–3 will remain conditioned as long as the using unit conditions the SEARCH line.

If the requested address is not in the K position, the resultant ACU output on the NO MATCH line turns on a No Match Latch designated NML in the drawing. The output from the NML to a line labeled NML ON goes via line 126 to OR gate 124 to lock the ACU in search-compare condition. Also, the requested address input gates A–1 previously conditioned from the NML ON line through inverter 128 and line 130, since the NML latch was off, are now deconditioned by the output on NML ON. The output on line NML ON also conditions one terminal of AND gates A–4 and A–5, the other terminals of which are respectively conditioned by the inverted signal and the now inverted signal from the EXCLUSIVE OR gate OE. The inputs to OE are the address bit $a_n$ received on line 220 and the match signal from the ACU received on line 104. Thus, when the NML is on, and address line 220 and match line 104 are both a binary 1 or both binary 0 the output of AND gate A–4 conditions the LEFT shift control of the shift control circuitry indicated in FIG. 5 as SHIFT CONTROL UNIT. Alternately, when the NML is on and one but not both of lines 220 and 104 is a binary 1, then gate A–5 conditions the LEFT shift control of the SHIFT CONTROL ON. The HOLD control lines of the shift control circuitry, previously activated by absence of output on the NML ON line via line 140, inverter 142 and line 144 to the HOLD input of the SHIFT CONTROL UNIT, are now inactivated by the inverted output from line NML ON.

The block 200 labeled 2 WAY K POSITION COUNTER in FIG. 5 may be any suitable counter capable of counting in one direction as UP the number of shifts of the shift circuitry on a search until the desired page is found, and then counting in the reverse direction or DOWN until the count returns to zero.

The output of counter 200 provides a signal on line 301 when the number of restore shifts is one less than the number of access shifts and provides a signal on line 302 when the number of restore shifts equals the number of access shifts. Assume for illustration, that the controlling address bit $a_n$ on line 220 is binary 0 thus indicating an even ordered page. This conditions the left shift of the shift control through line 138. Now suppose that the first left shift produces the desired page. Match line 104 is, therefore, conditioned, deconditioning line 138 and conditioning line 160 in preparation for right shifting to restore.

To control restore shifting, the address parity latch 310 retains the value of the address bit $a_n$ of the previously accessed page. The output of the address parity latch 310 and the current controlling address bit enter EXCLUSIVE OR gate 311. Thus, the output of this gate 310 is zero if the number of restore shifts should equal the number of access shifts and is one if the number of restore shifts should be one less than the number of access shifts. This control is performed by gates 312 and 313 and inverter 314. The counter outputs 301 and 302 into gates 312 and 313 signal, respectively, when the restore shift count is one less than and equal to the access shift count. Line 202 is conditioned when the restore shifting is complete. At this time gates 315 are conditioned by the output of single shot 316. This circuit generates a short pulse when gate A–6 becomes conditioned.

The output from gate A–6 turns off the NML latch via line 162 to its OFF terminal and sends the CLASS AVAILABLE signal to the using unit. The absence of output on the NML ON line deconditions gate A–5, maintains gate A–4 deconditioned, and restores all register positions to HOLD via line 140, inverter 142, line 144 and the HOLD connections of FIG. 4.

It will be appreciated that when the desired page is not located by the first and second comparisons, the access shift continues until the desired page reaches position K, because the presence of output on the NML ON line maintains gate A–4 or A–5 conditioned. The resultant MATCH output then produces the same operations just described for the case of a match on the first shift.

The comparison circuitry of the ACU illustrated in FIG. 5A utilizes EXCLUSIVE OR gates 170 the two inputs of which are connected, respectively, to lines 100 from the K position address bits and lines 122 from the MAR address bits. The output lines 172 of gates 170 are connected to an OR gate 174. The output line 176 of the OR gate is connected to one terminal of a first AND gate 178 and, through inverter 180, to one terminal of a second AND gate 182. The other terminals of AND gates 178 and 182 are conditioned from the COMPARE line of FIG. 5. An output from gate 178 is applied to the NO MATCH line whereas an output from gate 182 is applied to the MATCH line.

Since a two-terminal EXCLUSIVE OR gate has an output if, and only if, its two inputs are different, any difference between the values of corresponding bits on lines 100 and 122 produces an output from their gate 170 which is applied to line 176 through OR gate 174 and through gate 178 to the NO MATCH line, whereas by reason of inverter 180 there is no output on the MATCH line. When all compared bit values are the same, there is no output from gates 170, OR circuit 174 or gate 178 to the NO MATCH line whereas inverter 180 produces an output from gate 182 on the MATCH line.

When the registers of the class are initially loaded, a logical 1 is inserted in the 1 position cell at the right hand end of the counter, as indicated by the dotted line labeled INSERT 1 in FIG. 5, which is permanently stored in the counter, all other cells being at logical zero state.

I have described one embodiment of this invention using a single dimensional magnetic bubble shift register. Obviously, a number of changes can be made in this shift register without departing from the scope of the invention. For instance, a FET shift register such as found in application, Ser. No. 103,201 and now U.S. Pat. No. 3,704,452, filed in the names of Beausoleil et al and entitled "Shift Register Storage Unit" can be substituted for the magnetic bubble shift register or a multi-dimensional shift matrix of application, Ser. No. 306,952 and now U.S. Pat. No. 3,766,534 filed in the names of Beausoleil et al and entitled "Shift Register Storage Unit with Multi-dimensional Dynamic Ordering" can be employed using the features of the present invention.

Therefore, while the invention has been particularly shown and described with reference to a preferred embodiment thereof, it will be understood by those skilled in the art that the foregoing and other changes in form and details may be made therein without departing from the spirit and scope of the invention.

What is claimed is:

1. A memory comprising:

a plurality of K position shift registers each storing one bit of every page of a class of data, said class of data being divided into two groups with the bits of the pages from the first group located at the K position end of the shift register and the bits of the pages in the second group located at the 1 position end of the shift register;

a bidirectional accessing loop means in each shift register which includes all the positions of the shift register including the K bit of the shift register for shifting data of the first group bit by bit from the K–1 position through the K position and into the 1 position until the desired bit of data of the first group is in the K position or for shifting data of the second group bit by bit from the 1 position through the K position into the K–1 position until a desired bit of data of the second group is placed in the K position of the shift register; and a bidirectional reordering loop means in each of the registers which includes all the bits of the shift register except the K position for returning first group bits to the K–1 end of the shift register from the 1 position to position K–1 after accessing or for returning second group bits to the 1 position end of the shift register from the 1 position into the K–1 position after accessing whereby the last used bit remains in the K position and the other bits of the memory are organized in their group in order of last use.

2. The memory of claim 1 wherein certain of the bits in each page are address bits.

3. The memory of claim 2 wherein one of the address bits in each page indicates which group the page is in.

4. The memory of claim 2 wherein the low order address bits in each page indicates which group the page is in.

5. The memory of claim 4 wherein said shift registers are magnetic bubble shift registers.

6. A method of using a K position bidirectional shift register with a data accessing loop for shifting data in either direction into the K position for accessing and a data reordering loop for shifting data in either direction in any position of the shift register but the K position, comprising the steps of:

dividing data bits to be stored in the shift register into two groups;

storing the first group at the K–1 stage end of the shift register and storing the second group at the one stage end of the shift register;

using the accessing loop to shift a desired bit of data from the first group into the K position in one direction to access said desired bit;

using the reordering loop in the opposite direction to return any first group bits back to the position K–1 end of the shift register while said desired bit is held in the K position of the shift register;

using the accessing loop in said opposite direction to shift a requested bit located in the second group into the K position to access said requested bit; and using the reordering loop to move bits of said second group moved to the 1 position end of the shift register while said requested bit is retained in the K position of the shift register whereby the data bits within the group are positioned in the order in which they were shifted into the K position of the register.

* * * * *